F. W. COLE.
FIRE ALARM TELEGRAPH SYSTEM.
APPLICATION FILED APR. 25, 1908.

Patented Sept. 20, 1910.

Witnesses:
H. B. Davis
Cynthia Doyle

Inventor:
Frederick W. Cole
by Boyce & Harriman
Attys.

UNITED STATES PATENT OFFICE.

FREDERICK W. COLE, OF NEWTON, MASSACHUSETTS, ASSIGNOR TO THE GAMEWELL FIRE ALARM TELEGRAPH COMPANY, OF NEW YORK, N. Y., A CORPORATION OF NEW YORK.

FIRE-ALARM-TELEGRAPH SYSTEM.

970,887.      Specification of Letters Patent.      Patented Sept. 20, 1910.

Application filed April 25, 1908. Serial No. 429,153.

*To all whom it may concern:*

Be it known that I, FREDERICK W. COLE, of Newton, county of Middlesex, State of Massachusetts, have invented an Improvement in Fire-Alarm-Telegraph Systems, of which the following is a specification.

This invention relates to fire-alarm telegraph boxes and systems, and has for its object to provide the signal-boxes with means adapted to be set in condition to operate a distant signal, such for instance, as suitable receiving-instruments at the central-station, when the signal-transmitting mechanism needs rewinding or its actuating spring has broken; also, to provide the signal-boxes with emergency means for operating a distant signal, such for instance, as a receiving-instrument at the central-station, when the signal-transmitting mechanism needs rewinding or its actuating spring has broken; also, to provide means at the central or receiving-station adapted to be connected with the circuit to indicate whether the signal-transmitting mechanism of any box in the circuit needs rewinding, or its actuating spring has broken; also, to provide means included in the circuit at the central-station, for indicating when the signal-transmitting mechanism of any box in the circuit needs rewinding or its actuating-spring has broken.

Figure 1:
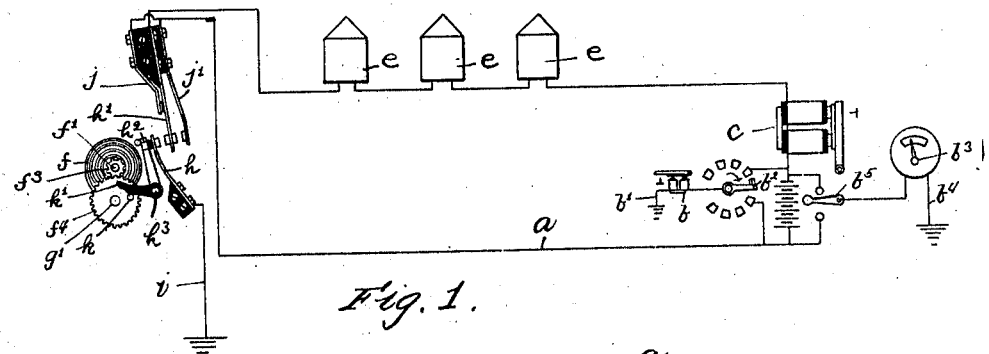
Figure 2:
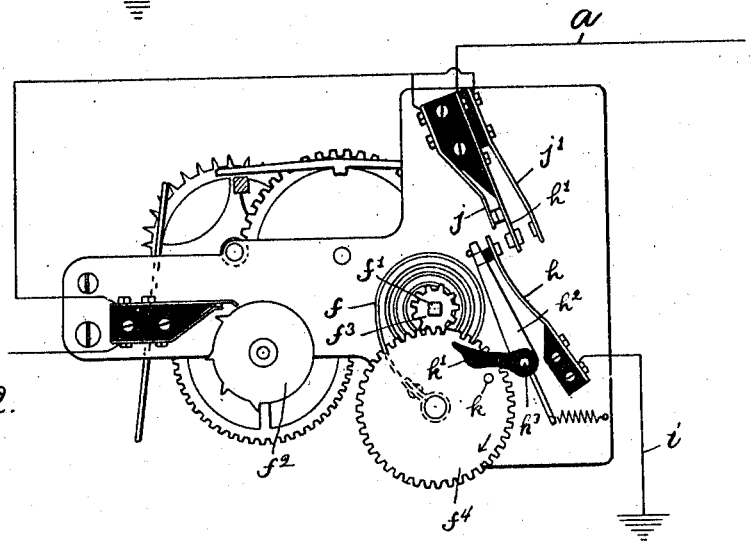
Figure 3:
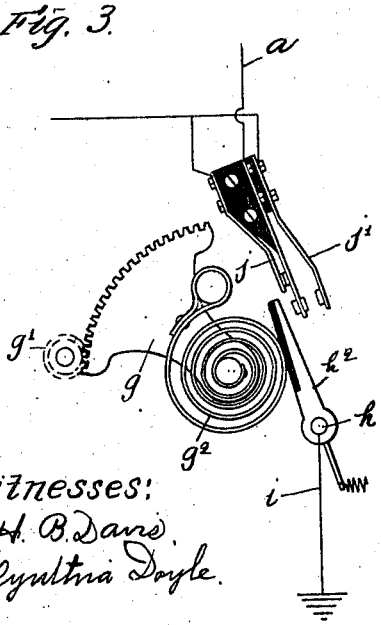
Figure 4:
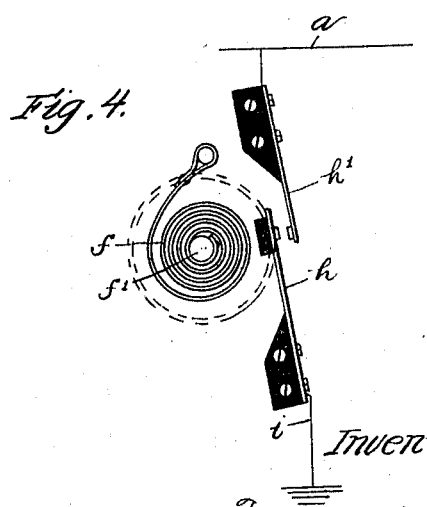

Figure 1 is a diagram of an electric signal-system embodying this invention. Fig. 2 is an enlarged detail of one form of signal-transmitting mechanism provided with circuit-operating devices embodying this invention. Fig. 3 is a detail showing a modified type of signal-transmitting mechanism and circuit-operating-devices embodying this invention. Fig. 4 is a detail showing one of the circuit-operating-devices only and the actuating-spring of a signal-transmitting mechanism arranged to set said circuit-operating device in condition to operate a distant signal.

$a$ represents the main electric circuit, $b$ represents a receiving-instrument at the central-station which is included in a normally open ground branch circuit $b'$. The branch circuit $b'$ is adapted to be connected through an automatic switch $b^2$, of any well known construction, with the main circuit at regular intervals of time for the purpose of ascertaining the condition of the circuit or whether any of the signal-boxes in the circuit need rewinding or require a new spring. The receiving-instrument $b$ is herein represented as a relay, the armature of which may operate any suitable audible signaling-device, not shown. In order to give information as to location of abnormal condition of the circuit, a visual-signal, such for instance as a volt-meter or ammeter may be employed, as represented at $b^3$, which is connected to the ground by a circuit wire $b^4$, and a switch $b^5$ is employed for the purpose of connecting said receiving-instrument $b^3$ with the main circuit $a$, at either side of the main battery. Normally the signal-receiving instrument or instruments will be disconnected from the main circuit, but whenever it is desired to test the signal-boxes for the purpose of ascertaining whether any one of them needs rewinding or its spring has broken, said switch $b^5$ will be moved to connect the ground branch circuit first with one side and then with the other side of the main battery, or the automatic switch may be operated.

I do not desire to limit my invention to any particular kind of receiving-instrument which is employed at the central-station, or to any particular manner of connecting it with the main circuit.

$c$ represents a signal-receiving relay which is included directly in the main circuit and is employed for regular signaling purposes, but is also adapted to be operated by the emergency circuit-operating devices in the signal-boxes, to be hereinafter described.

$e, e$ represent a number of signal-boxes arranged in the main circuit $a$. They are herein represented as fire alarm boxes of the closed circuit type.

Referring to Fig. 2 a well known form of signal-transmitting mechanism is shown wherein $f$ is the actuating-spring, $f'$ the winding-shaft and $f^2$ the signal-wheel which is revolved by the train and operates the circuit to transmit the regular box-number signal. A pinion $f^3$ is secured to the winding-shaft $f'$ which engages a gear wheel $f^4$ having a single wide tooth, which, when brought into engagement with the pinion limits its movement, said wheel $f^4$ serving as the stop wheel. When the winding-shaft is turned in one direction to wind the spring the stop wheel will be revolved in one direction until one side of its wide tooth engages the pinion and when turned in the opposite direction said stop wheel will be revolved in the opposite direction until the other side of its wide tooth engages the pinion.

Referring to Fig. 3, the actuating-mechanism of a "sector-box" is shown, which is another well-known form of signal-transmitting mechanism. In this instance the sector $g$ is secured to the winding-shaft which engages a pinion $g'$ connected with the train and the spring $g^2$ is attached to said winding-shaft.

In Fig. 2 the signal-transmitting mechanism is normally wound and adapted to be let off by a suitable actuator whenever it is desired to transmit the signal, and in Fig. 3 the signal-transmitting mechanism is normally held under tension but is rewound each time the signal is transmitted.

My present invention is applicable to either of these general types of signal-transmitting mechanisms, as well as to other types, hence I do not desire to limit my invention to any particular form of signal-transmitting-mechanism which may be employed.

Each signal-box is provided with a circuit-operating-device adapted to connect a ground branch circuit with the main circuit when the signal-transmitting mechanism needs rewinding or when its actuating spring breaks, and is subsequently restored to normal position and said ground branch circuit disconnected from the main circuit when said mechanism is rewound or its actuating spring has been replaced, and each signal-box is also provided with another circuit-operating-device adapted to open and then close the main circuit when the actuating-spring of the signal-transmitting-mechanism breaks or when the signal-transmitting-mechanism has run down to the danger point after being rewound. The last named circuit-operating-device is herein termed an emergency circuit-operating-device to distinguish it from the first named circuit-operating-device and for the reason that it is only called into operation in case of an emergency. In fact, said emergency circuit-operating-device may be omitted if desired.

Referring to Figs. 1 and 2, $h$ and $h'$ represent two contact pens attached to blocks of insulating material. They overlie each other but are normally separated. They constitute the first named circuit-operating-device. The pen $h$ is connected with a ground branch circuit $i$, and the pen $h'$ is connected with the main circuit $a$. The pen $h$ is movable into engagement with the pen $h'$ to connect the ground branch circuit with the main circuit and to provide for thus moving said pen, an actuating-lever $h^2$ may be employed which is secured to a pivot-shaft $h^3$, and which extends up along-side of the pen $h$, so that when moved on its pivot it will engage and move said pen. The actuating-lever is located in proximity to the actuating-spring $f$ of the signal-transmitting-mechanism, so as to be engaged and moved by said spring when the latter expands incident to the signal-transmitting-mechanism operating and sending one or more alarms, or to the spring breaking. In practice I prefer to arrange said actuating-lever so that it may be engaged and moved by the actuating-spring when several alarms have been sent or when the mechanism has run part way down. I prefer to employ the actuating-spring as the means for moving the circuit-operating-device when setting it in condition to cause the receiving-instrument at the central station to respond, but so far as my invention is concerned any other part of the signal-transmitting-mechanism may be employed. Under ordinary conditions the receiving instrument at the central station will be connected in circuit at frequent intervals so that in case the circuit-operating-device of any one of the signal-boxes in the circuit should be set, said receiving-instrument will respond, and steps may be immediately taken to rewind or repair the signal-transmitting-mechanism of the box which caused the receiving-instrument to operate.

Referring to Fig. 4 this circuit-operating-device only is shown comprising the two contact pens $h$ and $h'$, the former being arranged to be engaged and moved directly by the actuating-spring of the signal-transmitting-mechanism, and this modification is shown for the purpose of illustrating the idea that this circuit-operating-device only may be employed for the carrying out of the essential part of my invention. However, in case it should so happen that the testing instrument at the central-station should not be connected with the circuit, as often as required, or should be overlooked, and one of the signal-boxes should be permitted to run nearly down before it is rewound, the emergency circuit-operating-device is brought into action. This emergency circuit-operating-device consists of a pair of contact pens $j$, $j'$ attached to a block of insulating material and connected to the main circuit $a$. They are arranged at opposite sides of the contact pen $h'$, and provided respectively with contacts adapted to be engaged by contacts on the opposite sides of said pen $h'$ as said pen is moved. Normally the pen $h'$ is in engagement with the pen $j$ so that the main circuit is closed, but when said pen $h'$ is moved considerably it will first disengage the pen $j$ and thereafter engage the pen $j'$, thereby momentarily opening the main circuit and causing the receiving-instrument $c$ at the central-station to respond, which in a fire alarm system will cause a single blow to be struck on the bells. The contact pen $j$ is made quite slender and is arranged to follow and thereby remain in engagement with the contact pen $h'$ for a short distance, so that the pen $h'$ may be moved slightly without disengaging the pen $j$ and thereby opening the main circuit. To provide for operating said emergency circuit-operating-device in case the signal-transmitting-mechanism nearly runs down, an emergency actuator may be provided for the actuating-lever, consisting of a pin $k$ on the stop wheel $f^4$ which is arranged to engage an arm $k'$ secured to the pivot-shaft $h^3$, and said pin can engage said arm $k'$ and move the actuating-lever $h^2$ just before the signal-transmitting-mechanism runs completely down. In case, therefore, that the test at the central-station should not be applied and the signal-transmitting-mechanism runs nearly down, the actuating-lever $h^2$ will be moved its full distance by the pin of the stop wheel and the emergency circuit-operating-device will be operated, calling attention to the fact. Furthermore, in case the actuating-spring of the signal-transmitting-mechanism breaks the actuating-lever $h^2$ will be moved its full distance and the ground branch circuit will be connected with the main circuit and the emergency circuit-operating-device will also be operated.

Referring to Fig. 3 the emergency actuator of the emergency circuit-operating-device is omitted yet said circuit-operating-device is adapted to be operated by the breaking of the actuating spring.

Having thus described my invention, what I claim as new and desire to secure by Letters Patent is:—

1. In a signal-box, signal-transmitting mechanism, a circuit-operating device, a ground branch circuit adapted to be connected with the main circuit by said circuit-operating device, means operated by said transmitting-mechanism when one or more alarms have been sent to connect the ground branch with the main circuit and operated by the winding-shaft when turned to rewind said mechanism to restore said circuit-operating device and disconnect said ground branch from the main circuit, substantially as described.

2. In a signal-box, signal-transmitting-mechanism having a box-number circuit-operating device, a main circuit operated thereby, and another circuit-operating-device for momentarily opening said circuit, means operated by said transmitting-mechanism when one or more alarms have been sent for operating said last-named circuit-operating-device to open and close said circuit and operated by the winding-shaft when turned to rewind said mechanism to restore said last-named circuit-operating-device to normal position, substantially as described.

3. In a signal-box, signal-transmitting-mechanism, having a box-number circuit-operating device, another circuit-operating-device, means operated by said mechanism for setting said last-named circuit-operating-device in condition to operate a distant signal and operated by the winding-shaft when turned to rewind said mechanism for restoring said last-named circuit-operating-device, and an emergency circuit-operating-device, and means also operated by said mechanism for operating said emergency circuit-operating-device while the last-named circuit-operating device is set, which is subsequently restored by the winding-shaft when turned to rewind said mechanism, substantially as described.

4. In a signal-box signal-transmitting mechanism, a circuit-operating device, a ground branch circuit adapted to be connected with the main circuit by said circuit-operating device, means operated by said transmitting-mechanism when one or more alarms have been sent to connect the ground branch with the main circuit and operated by the winding-shaft when turned to rewind said mechanism to restore said circuit-operating device and disconnect said ground branch from the main circuit, and an emergency circuit-operating device for momentarily opening the main circuit, and means operated by said mechanism for operating said emergency circuit-operating device to open and close the main circuit which is subsequently restored by the winding shaft when turned to rewind said mechanism, substantially as described.

5. In a signal-box, signal-transmitting mechanism having a stop-wheel connected with its winding-shaft, and having a box-number circuit-operating device, and another circuit-operating device disposed adjacent its actuating-spring which is engaged and set by said spring in condition to operate a distant signal and which is restored when said spring is re-wound, and an emergency circuit-operating device, and means operated by said stop-wheel for operating said emergency circuit-operating device, which is subsequently restored when said stop-wheel is returned to normal position by re-winding the signal-transmitting mechanism, substantially as described.

6. In an electric signal system, an electric circuit connecting a signal-box with a central station, two receiving instruments at the central station, one included in the circuit and the other adapted to be connected with the circuit, signal-transmitting mechanism contained in the box having a box-number circuit-operating device for operating one of said receiving instruments, another circuit-operating device arranged in the box, and means operated by the signal-transmitting mechanism when one or more alarms have been sent for setting said last-named circuit-operating device in condition to operate the other receiving instrument and operated by the winding shaft when turned to rewind said mechanism for restoring said last-named-circuit-operating device, substantially as described.

7. In an electric signal system, an electric circuit connecting a signal-box with a central station, a receiving instrument at the central station, signal-transmitting mechanism contained in the box having a box-number circuit-operating device for operating said circuit, and another circuit-operating device for momentarily opening said circuit, means operated by said transmitting-mechanism when one or more alarms have been sent for operating said last-named circuit-operating device to open and close said circuit, and operated by the winding shaft when turned to rewind said mechanism to restore said last-named circuit-operating device to normal position, substantially as described.

8. In an electric signal system, a main electric circuit connecting several signal-boxes with a central-station, signal-transmitting mechanism in each box, a circuit-operating device in each box, a ground branch circuit at each box adapted to be connected with the main circuit by the circuit-operating device therein, means operated by the signal-transmitting mechanism in each box when one or more alarms have been sent by it, for moving the circuit-operating device therein to connect the ground branch circuit with the main circuit and operated by the winding-shaft when turned to rewind the transmitting-mechanism for restoring said circuit-operating device and disconnecting the ground branch from the main circuit, a ground branch circuit at the central station, a receiving-instrument included in said ground branch circuit, and means for connecting said ground branch circuit with the main circuit, substantially as described.

9. In an electric signal system, an electric circuit connecting a signal-box with a central station, signal-transmitting mechanism contained in said box having a box-number circuit-operating device and another circuit-operating device, a ground branch circuit adapted to be connected with the main circuit by said last named circuit-operating device, means operated by said transmitting-mechanism when one or more alarms have been sent to operate said last-named circuit-operating device and connect the ground branch with the main circuit and operated by the winding shaft when turned to rewind said mechanism to restore said last-named circuit-operating device and disconnect said ground branch from the main circuit, a receiving instrument at the central station and in the main circuit for receiving the box-number signals, a ground branch circuit at the central station, a receiving instrument included in said ground branch circuit, and means for connecting said ground branch circuit with the main circuit, substantially as described.

10. In an electric signal-system, an electric circuit connecting several signal-boxes with the central-station, two receiving-instruments at the central-station, one included in the circuit and the other adapted to be connected with the circuit, two circuit-operating-devices at each box for respectively operating said receiving-instruments, and means operated by the signal-transmitting mechanism of each box for setting one of the circuit-operating-devices in condition to operate its receiving-instrument and for subsequently operating the other circuit-operating-device, and operated by the winding-shaft when turned to rewind said transmitting-mechanism for restoring said circuit-operating-devices, substantially as described.

In testimony whereof, I have signed my name to this specification, in the presence of two subscribing witnesses.

FREDERICK W. COLE.

Witnesses:
B. J. NOYES,
H. B. DAVIS.